United States Patent
Amini et al.

(10) Patent No.: US 8,321,865 B2
(45) Date of Patent: Nov. 27, 2012

(54) PROCESSING OF STREAMING DATA WITH A KEYED DELAY

(75) Inventors: Lisa Amini, Hawthorne, NY (US); Henrique Andrade, Hawthorne, NY (US); Mitchell A. Cohen, Hawthorne, NY (US); Bugra Gedik, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 12/541,435

(22) Filed: Aug. 14, 2009

(65) Prior Publication Data

US 2011/0041133 A1 Feb. 17, 2011

(51) Int. Cl.
  *G06F 9/46* (2006.01)
  *G06F 15/167* (2006.01)
  *G06F 7/00* (2006.01)
  *G06F 11/00* (2006.01)

(52) U.S. Cl. .......... 718/101; 709/214; 700/224; 714/39

(58) Field of Classification Search .................. None
See application file for complete search history.

(56) References Cited

U.S. PATENT DOCUMENTS

| | | | |
|---|---|---|---|
| 5,790,779 A * | 8/1998 | Ben-Natan et al. ............. | 714/39 |
| 7,062,681 B2 * | 6/2006 | Larsson et al. ................. | 714/39 |
| 7,139,938 B2 * | 11/2006 | Marwaha ........................ | 714/48 |
| 7,289,988 B2 * | 10/2007 | Joseph ............................ | 700/224 |
| 7,331,527 B2 | 2/2008 | Mo et al. | |
| 2005/0010545 A1 | 1/2005 | Joseph | |
| 2005/0171833 A1 | 8/2005 | Jost et al. | |
| 2008/0114853 A1 * | 5/2008 | Holt .............................. | 709/214 |
| 2008/0263062 A1 | 10/2008 | Klein et al. | |
| 2008/0263096 A1 | 10/2008 | Klein et al. | |
| 2009/0113437 A1 | 4/2009 | Sedukhin et al. | |
| 2011/0040734 A1 | 2/2011 | Andrade et al. | |
| 2011/0040887 A1 | 2/2011 | Andrade et al. | |

OTHER PUBLICATIONS

Gedik et al., "SPADE: The System S Declarative Stream Processing Engine," SIGMOD '08, Jun. 9-12, 2008, Vancouver, BC, Canada.
Office Action for U.S. Appl. No. 12/541,481 (U.S. Publication No. 2011/0040734) dated Sep. 21, 2011.
Office Action for U.S. Appl. No. 12/541,465 dated Mar. 28, 2012.

* cited by examiner

*Primary Examiner* — Jennifer To
*Assistant Examiner* — Bing Zhao
(74) *Attorney, Agent, or Firm* — William Stock, Esq.; Blanche E. Schiller, Esq.; Heslin Rothenberg Farley & Mesiti P.C.

(57) ABSTRACT

A keyed delay is used in the processing of streaming data to decrease the processing performed and the output provided. A first event, within a particular window, having a particular key starts a delay condition. Arriving events with the same key replace the previous arrival for that key until the delay condition is satisfied. In response thereto, the latest event with that key is output.

17 Claims, 6 Drawing Sheets

OUTGOING EVENT PROCESSING

FIG. 5A

INCOMING EVENT PROCESSING

FIG. 6

PROCESSING OF STREAMING DATA WITH A KEYED DELAY

BACKGROUND

This invention relates, in general, to processing streaming data, and, in particular, to improving processing of such data.

Processing within a data processing system can include various forms, including non-stream processing and stream processing. In non-stream processing, data is received, saved and later processed. In contrast, in stream processing, data is processed, as it is continuously received.

Examples of stream processing systems include large scale sense-and-respond systems, which continuously receive external signals in the form of one or more streams from multiple sources and employ analytics aimed at detecting critical conditions and, ideally, responding in a proactive fashion. Examples of such systems abound, ranging from systems deployed for monitoring and controlling manufacturing processes, power distribution systems, and telecommunication networks, to environmental monitoring systems, to algorithmic trading platforms, etc. These sense-and-respond systems share the need for:
  (1) calculating baselines for multiple samples of incoming signals (e.g., instantaneous electricity production levels, the fair price of a security, among others); and/or
  (2) correlating the computed value for a signal with other signals (e.g., instantaneous electricity consumption levels, the ask price of a security, among others).

This paradigm of streaming analytics focuses on incremental processing as data is received from external sources. This differs from the typical store-and-process paradigm (e.g., non-stream processing) that answers queries by processing the needed data for that query at the time the query is issued. The advantage of incremental processing is the availability of analysis results with low latency and high throughput.

BRIEF SUMMARY

Although stream processing systems are capable of ingesting data from high speed data feeds, the amount of data output by these systems may be overwhelming to those systems that are to receive the output and the amount of data processed and resources consumed may be excessive. To limit the computing resources required for a workload, a need exists for a capability that decreases the processing of streaming data. A further need exists for a capability that reduces the data output from a stream processing system.

The shortcomings of the prior art are overcome and additional advantages are provided through the provision of a computer program product for processing streaming data. The computer program product comprises a computer readable storage medium for execution by a processing circuit for performing a method. The method includes, for instance, receiving a stream of data; determining whether a new event of the stream of data has a key which is the same key as a previous event, the previous event being currently maintained as a stored event; in response to determining the new event has the same key as the previous event, replacing the previous event with the new event as the stored event; and in response to meeting a specified output condition provided for events having that same key, output an event, wherein if the new event replaced the previous event, the event output is the new event and the previous event is not output.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for decreasing processing of streaming data by employing a keyed delay. A capability is provided for limiting the processing of a stream of data, while meeting the user requirements and ensuring that the latest data is processed. This limiting is possible when, for example, there are a flow of events (e.g., records, tuples) where some events are for the same entity as previous events and they replace those previous events, and there are more events per entity than are needed based on user requirements, such as a specific latency, and load shedding can be employed to filter out irrelevant (i.e., obsolete) updates.

As one example, the most recent event for each unique replacement key value(s) is maintained, and the most recent event for each replacement key that has a new arrival is output at a specified rate.

In one particular example, the first arriving event within a particular window (e.g., prior to output) having a particular key starts a delay condition. Then, arriving events for the same key replace the previous arrival for that key until the delay condition is met (e.g., a time expires, a count is met, etc.). At that point, the latest event with that key is output. The output includes only one event for that key since all the other events for that key within that delay condition have been replaced. As examples, the delay condition is user specified or programmatically determined.

Figure 1:
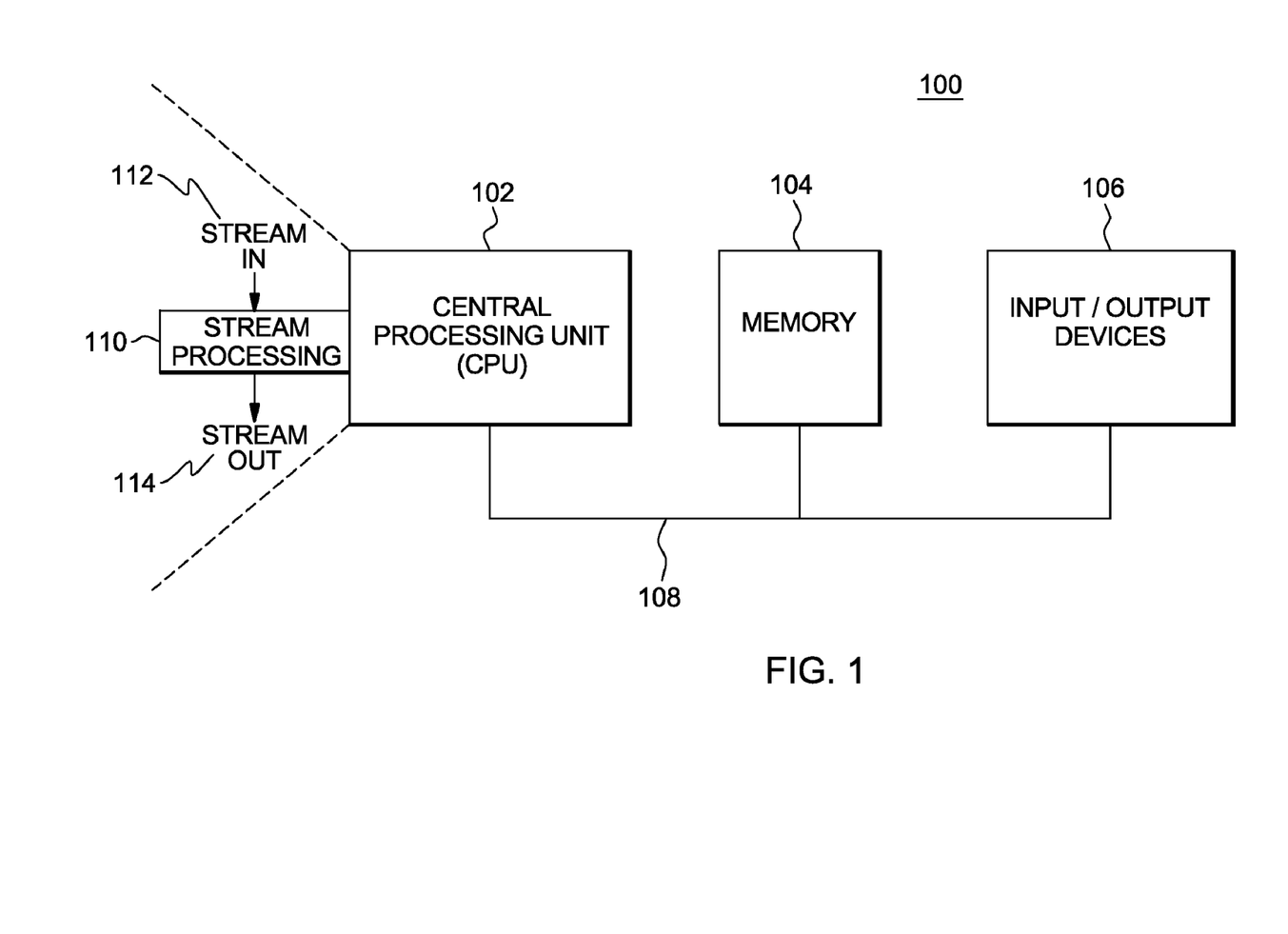
FIG. 1 depicts one embodiment of a data processing system to incorporate and use one or more aspects of the present invention.

One embodiment of a data processing system to incorporate and use one or more aspects of the present invention is described with reference to FIG. 1. In this example, a data processing system 100 includes, for instance, a processor 102 (e.g., a central processing unit (CPU)), a memory 104 (e.g., main memory), and one or more input/output (I/O) devices 106, coupled to one another via, for example, one or more buses 108. As an example, processor 102 is an x86 processor offered by Intel® Corporation, Santa Clara, Calif. Processor 102 may execute an operating system, as well as applications or logic to perform one or more tasks. In one example, processor 102 executes stream processing logic 110 to implement one or more aspects of the present invention. Intel® Corporation is a registered trademark of Intel® Corporation, Santa Clara, Calif., U.S.A. Other names used herein may be registered trademarks, trademarks or product names of International Business Machines Corporation or other companies. In embodiments of the invention, stream processing logic may be comprised of a group of operators, each of which may be software that executes on a processor such as processor 102 to perform one or more functions, including providing an output stream to a next operator. In embodiments, one of the operators may be a keyed time delay operator 201 as discussed below with reference to FIG. 2. As shown in FIG. 1, an input stream of events 112, in this example shown as events 200-210, may be provided to stream processing logic 110 and keyed time delay operator 201, which may output a stream of events 114, in this example shown as 208 and 212.

The data processing system described above, as well as other data processing systems, is capable of handling high volume streaming event processing. With such processing, there are situations where many incoming events are providing updated information about the same item. If these similar events arrive within a short time from one another, they cause much extra processing on the system either requiring greater computer resources or increasing the latency in providing results. As an example, a financial market ticker could have, for instance, ten consecutive ticks for a single stock within one microsecond. In this situation, it is often the case that the only tick that is necessary is the last one. If all the others are processed, then ten times the amount of work is performed with no improvement in accuracy of computation results. Thus, in accordance with an aspect of the present invention, only the last one, at a defined time, is processed. Only the last one, for that defined time, is output for further processing. This is described in further detail below.

For clarity, examples herein are described that relate to stocks and related information; however, these are only examples. There are many other events that can be similarly processed and these events are considered within the scope of the present invention.

One particular stock market example is depicted and described with reference to FIG. 2. This figure shows the output produced based on a sample input and a keyed delay. When multiple events describing the same entity arrive at a rate higher than that which is needed by an application, only the last record (with the most up-to-date information) is used. To limit processing of operators downstream, only the non-filtered subset of events is forwarded. In this particular example, the allowable delay is specified as 4 units (where possible units include, for instance, time units, such as seconds, milliseconds, microseconds, etc.; count units; as well as others). The circles in FIG. 2 specify the order of the sample input events and the corresponding output events. An entity can have multiple events arrive that relate to it. The entity is identified by a unique key.

Figure 2:
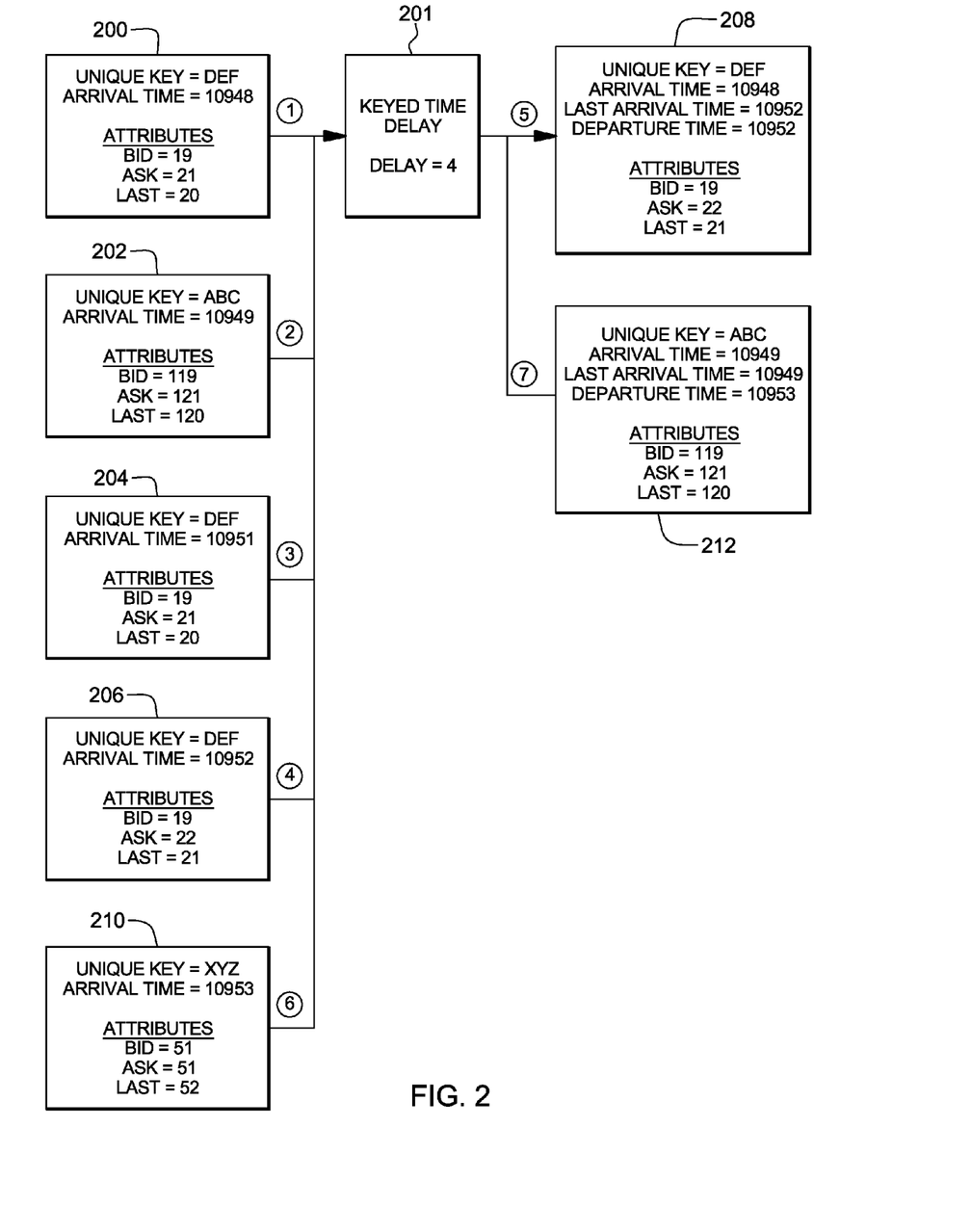
FIG. 2 depicts one example of the output produced using a keyed delay on a specific sample input, in accordance with an aspect of the present invention.

Referring to FIG. 2, at 1, an event for entity DEF (DEF is the unique key for the entity) arrives at time 10948 (200). This is the first event, in a defined window, having key DEF, and therefore, a delay condition is commenced (e.g., a timer for DEF is set/started). The event has the attributes of Bid equals 19, the Ask price is 21, and Last equals 20. In this example, a keyed delay 201 is a time delay equal to four microseconds, and it is assumed that each event takes one microsecond. At this point, nothing is output, since the delay condition of four microseconds has not been met. For example, an entity may be a stock ticker symbol having a unique key, and all events for that entity may include that same key of the entity (i.e., the events have the same key).

The second event at 2 is for the entity having a unique key equal to ABC and an arrival time of 10949 (202). Since the second event includes a new unique key, a delay condition for events having key ABC is set/started (e.g., a timer for ABC is set/started). At this point, again nothing is output. The processor waits before outputting to see if another record for entity ABC arrives within the specified delay, 4 time units. Further, the processor waits on the sending of information for entity DEF, as the specified delay has not been reached for that entity either.

The third event at 3 is for the entity having the unique key equal to DEF (204), and the fourth event at 4 also is for the entity having the unique key of DEF (206). Since four microseconds has passed since receiving the record at 1, an output 208 is provided at 5. The output includes the unique key equal to DEF, an arrival time equal to 10948, since that was the original arrival time of the first event having a unique key of DEF; a last arrival time of 10952, since that was the last time a DEF event arrived; and a departure time of 10952, which represents the output time. The attributes are Bid equals 19, Ask equals 22, and Last equals 21, which are the attributes of the last received event 206 having a unique key equal to DEF.

Thereafter, another event is received at 6 for the entity with a unique key equal to XYZ and arrival time 10953 (210). Again, since this event is for an entity having a new unique key, a delay condition for events having key XYZ is started. Since four microseconds have passed since unique key equals ABC (202) has been received, an output occurs at 7 for the unique key equal to ABC (212). It has an arrival time of 10949, last arrival time 10949, departure time 10953, and attributes of Bid equal to 119, Ask 121 and Last equal to 120. These are the attributes of the event received at time 2, since no other event having a unique key equal to ABC has been received replacing those attributes before meeting the delay condition, which provides the output.

If, in a further example, another event is received for DEF, after the output at 5, then a new delay condition is started for DEF, and processing continues, as described above.

Figure 3:
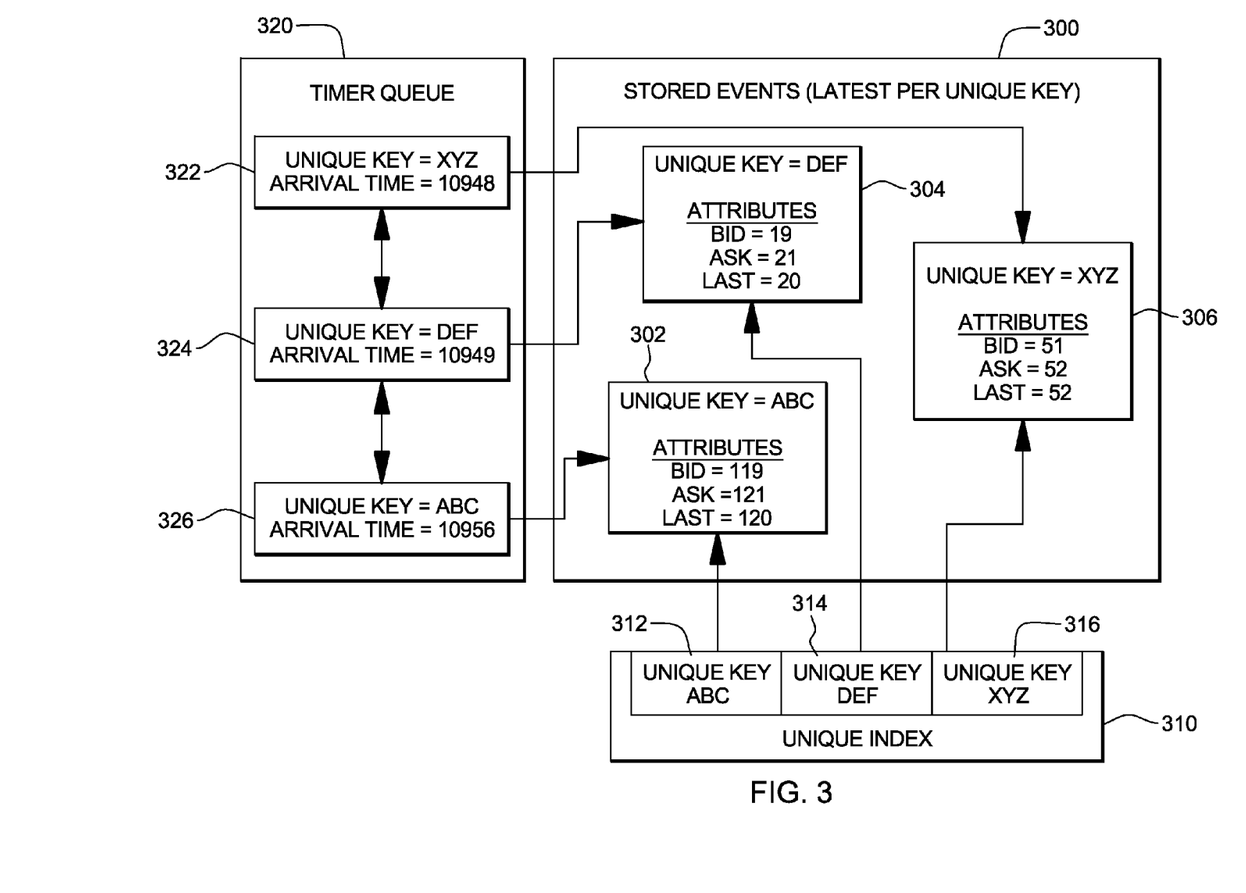
FIG. 3 depicts examples of data structures used to implement a keyed delay operator, in accordance with an aspect of the present invention.

In one embodiment, the latest events per unique key are stored in one or more data structures. As examples, these data structures are used to keep track of which records have arrived, but have not yet been replaced or output. As depicted in FIG. 3, one data structure used is a Stored Events data structure 300. This data structure is used to store an event's value, in response to the arrival of that event, until the event is output or replaced by a newer event with the same unique key. In this data structure, there is at most one record for a given unique key value (e.g., the most recent one for a particular entity). Data structure 300 includes, for instance, a record 302 for an event having unique key ABC, as well as records 304 and 306 for unique key DEF and unique key XYZ, respectively.

To facilitate access to the data in this data structure, a unique index data structure 310 is provided that includes unique keys for symbols ABC (312), DEF (314) and XYZ (316). This data structure enables the finding of records in data structure 300 by unique index to allow replacement of records made obsolete by the arrival of a new event with the same unique key (i.e., an entity is uniquely identified by a key). Each record in the index points to the key's record in the Stored Events data structure. While this embodiment uses a flat index, many different indexing techniques could be used in other embodiments.

Another data structure that is provided is a timer queue data structure 320, which includes for each unique key, the arrival time for that key. For instance, a record 322 includes the arrival time for unique key XYZ; record 324 includes an arrival time for unique key DEF; and record 326 includes the arrival time for unique key ABC. This data structure enables the finding of records in data structure 300 by time. It enables the finding of records that have outlived the specified delay. In the Timer Queue data structure, a list of pointers to the Stored Events is stored, ordering the list by arrival time (where arrival time is actually an arrival count in the count-based delay). This allows an easy check of which records need to be output because of the specified delay being reached, as well as finding the details of those records.

Figure 4:
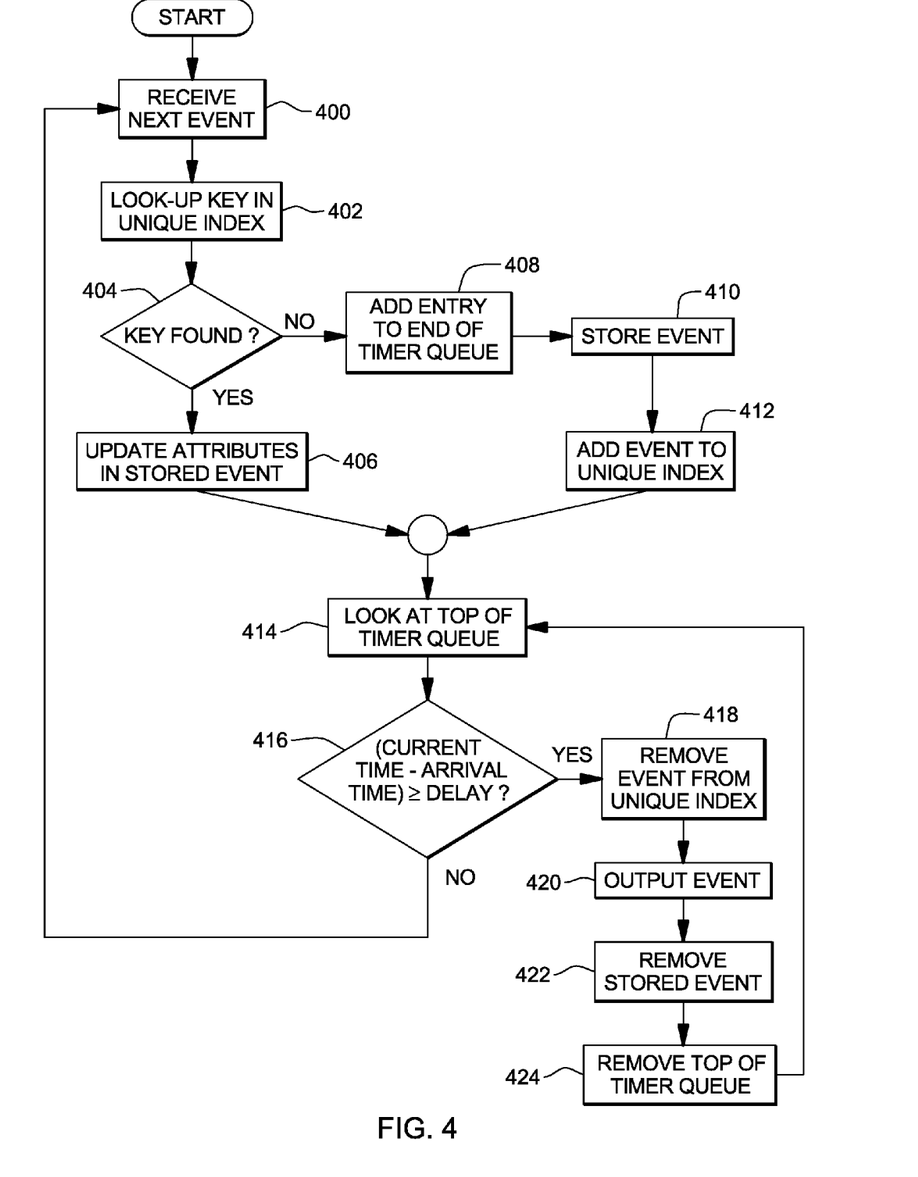
FIG. 4 depicts one embodiment of the logic to implement a keyed delay in a continuous flow of events, in accordance with an aspect of the present invention.
Figure 5A:
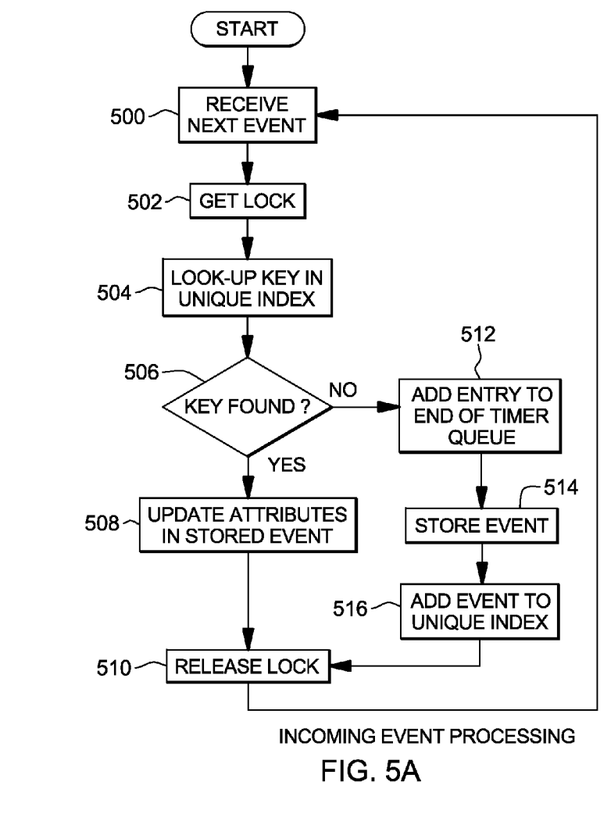
FIG. 5A depicts one embodiment of incoming event processing using keyed delay in a non-continuous flow of events, in accordance with an aspect of the present invention.
Figure 5B:
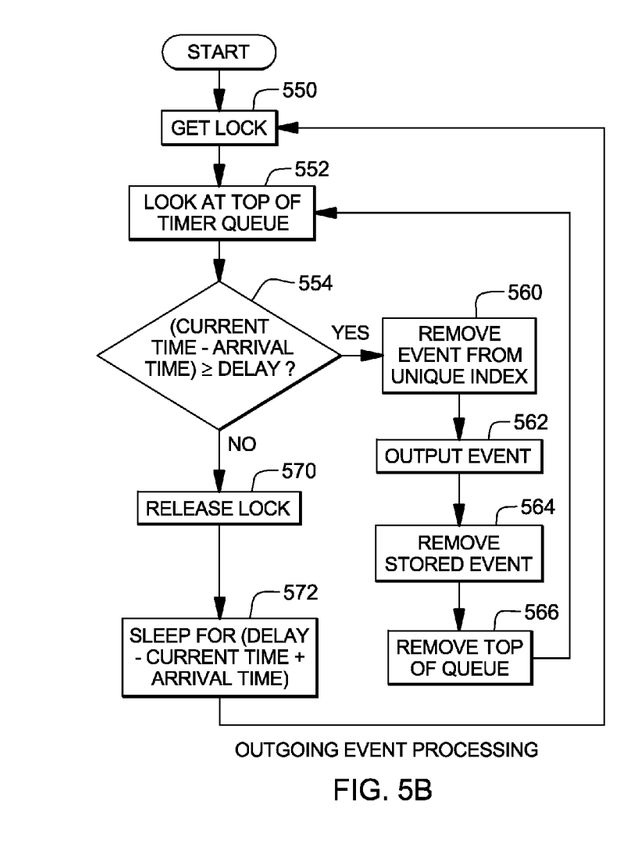
FIG. 5B depicts one embodiment of outgoing event processing for a non-continuous flow of events, in accordance with an aspect of the present invention.

The use of these data structures in processing streaming data is described with reference to FIGS. 4 and 5A-5B. FIG. 4 depicts one embodiment of the logic associated with processing in an environment that relies on a continuous flow of events and includes the keyed delay, in accordance with an aspect of the present invention; while FIGS. 5A-5B depict one embodiment of the logic associated with processing in an environment which does not rely on a continuous flow of events (e.g., there are breaks in the streaming). With either implementation, the logic is performed by the processor that receives the streamed data.

Referring to FIG. 4, by relying on a continuous flow of events, there is no need to have a timer or have a process periodically "wake-up" to check the time. The only check is of which records need to be output based on their arrival times (or counts) and the specified delay when a new event is received.

With reference to FIG. 4, initially, a next event is received, STEP 400. The key of that event is looked up in the unique index data structure to determine if it is already a unique index, STEP 402. If the key is found, INQUIRY 404, then one or more attributes in the stored event for that unique key are updated (e.g., Bid, Ask and/or Last are updated), STEP 406. However, if the key is not found, then an entry is added to the end of the timer queue, which includes, for instance, storing the key and arrival time in the timer queue data structure, STEP 408; the event is stored in the Stored Events data structure, which includes storing the key and associated attributes, as examples, in the Stored Events data structure, STEP 410; and the event is added to the unique index key pointing to the stored event, which includes, for instance, storing the key in the unique index data structure as the pointer to the appropriate record in the Stored Events data structure, STEP 412.

Subsequent to adding the event to the unique index, STEP 412, or updating the attributes in the stored event, STEP 406, the top of the timer queue is checked to determine if any items are to be output because of reaching the specified delay for those keys, STEP 414. Processing starts, for instance, at the front of the timer queue looking at events in the queue until the queue becomes empty or the front item in the queue has not been delayed the specified delay (e.g., time or count). For each of the top events that has reached the specified delay, it is removed from the unique index, its contents are output as an event, and the event is removed from both the stored events and the timer queue.

Thus, in one implementation, if current time minus arrival time is less than delay, INQUIRY 416, then processing continues with receiving the next event, STEP 400. However, if current time minus arrival time is greater than or equal to delay, then the event is removed from the unique index data structure, STEP 418, and the event is outputted, STEP 420. The event may be output for further processing, output to a user, output to a database, output to storage or another repository, and/or output to another application or logic, as examples.

In addition to the above, the stored event is removed from the Stored Events data structure, STEP 422, and it is removed from the top of the timer queue, STEP 424. Processing then continues with STEP 414. This concludes the processing for the previously received event.

As a further embodiment, processing in a sporadic event environment is described with reference to FIGS. 5A and 5B. This environment is a stream processing environment, but does not necessarily depend on a continuous flow of events. The events may arrive more sporadically. In this example, two threads of processing are used, one to process the incoming events, as described with reference to FIG. 5A, and the other to check which records need to be output and process them accordingly, as described with reference to FIG. 5B. The two threads may be executed in parallel. Since the two threads work on one or more of the same data structures, synchronization is provided. A typical run-time implementation of these two flows would be to have the two threads in the same process working on the structures in memory shared between them.

Referring initially to FIG. 5A, the next event is received, STEP 500, and a lock is obtained to lock the shared memory holding the data structures to ensure the outgoing event processing cannot access the structures at the same time, STEP 502. Thereafter, the key of that event is looked up in the unique index data structure to determine if it is already a unique index, STEP 504. If the key is found, INQUIRY 506, then one or more attributes in the stored event for that unique key are updated (e.g., Bid, Ask and/or Last are updated), STEP 508, the lock is released, STEP 510, and processing continues at STEP 500.

However, if the key is not found, INQUIRY 506, then an entry is added to the end of the timer queue, STEP 512; the event is stored in the stored events data structure, STEP 514; and the event is added to the unique index key pointing to the stored event, STEP 516. Subsequently, the lock is released, STEP 510, and processing proceeds to STEP 500. This concludes incoming event processing.

Referring to FIG. 5B, to output an event, the lock for the shared memory containing the data structures is obtained to ensure the incoming event processing is not concurrently using the shared memory, STEP 550. Thereafter, the top of the timer queue is reviewed to determine which items, if any, have reached the specified delay, and thus, are to be output, STEP 552. Processing starts at the front of the timer queue looking at events in the queue until the queue becomes empty or the front item on the queue has not yet been delayed by the specified condition. For each of the top events that has reached the specified delay, it is removed from the unique index, its contents are output as an event, and the event is removed from both the stored events and the timer queue. Thus, in one implementation, if the current time minus arrival time is greater than or equal to delay, INQUIRY 554, then the event is removed from the index queue, STEP 560, and the event is outputted, STEP 562. Additionally, the stored event is removed, STEP 564, as well as the top of the timer queue, STEP 566. Processing then continues with STEP 552.

However, returning to INQUIRY 554, if the current time minus arrival time is less than delay (or the queue is empty; i.e., no arrival time), then the lock is released, STEP 570, and the operator sleeps for an amount of time equal to delay minus current time plus arrival time (or, the operator could sleep a fixed amount of time slightly less than this to allow for some processing), STEP 572. Processing then continues to STEP 550.

In accordance with one or more aspects of the present invention, a model is provided where applications are constructed based on operators (e.g., keyed delay), where each operator takes in one or more streams of events (or records) and outputs one or more streams of events. By piecing together these operators based on the streams they use, a full stream processing application can be constructed. These applications can be created by a user using a programming language created to describe these operators and their input and output streams. Alternatively, a graphical user interface with drag and drop along with input wizards can be used to create these same applications.

As one example, the keyed delay operator described above can be specified in a programming language geared towards streaming applications (e.g., the SPADE programming language offered by International Business Machines Corporation described in Gedik et al. in "SPADE: The System S Declarative Stream Processing Engine," SIGMOD Conference 2008: 1123-1134). The language includes built-in, as well as user-defined, operators, which take in streams and output streams.

One embodiment of the syntax for a time-based delay is as follows:

```
stream OrdersD ( schemaFor (Orders) ) :=
    KeyedDelay (Orders)
        [DelayType: Time;
         BufferDelay: 0.01;
         ReplacementKey: OrderID] { }
```

One example of the syntax for a count-based delay is as follows:

```
stream OrdersD ( schemaFor (Orders) ) :=
    KeyedDelay (Orders)
        [DelayType: Count;
         BufferDelay: 100;
         ReplacementKey: OrderID] { }
```

Both embodiments start with the specification of an output stream. This output stream is then set to transport the results of an operator; in this case, the name of the operator is KeyedDelay. The input stream consumed by the operator is called Orders. There are three parameters that specify the details for how the operator is to function. In the time-based delay, the DelayType is specified as Time, while in the event count-based delay, the DelayType is specified as Count. The second parameter is how long inputs are to be delayed (awaiting a potential update on the same entity). The third parameter specifies what field(s) within each arriving event of the input stream uniquely identifies the entity being described by the incoming event.

This is just one example of a possible syntax that describes the keyed delay operator. One could just as easily have two separate operators, TimeKeyedDelay and CountKeyedDelay, eliminating the need for the first parameter. Alternatively, the operator could be used in a graphical user interface for creating streaming applications. There are many other potential syntactical variations and alternative specification mechanisms possible and the examples provided herein are for illustrative purposes only.

Described in detail above is at least one example of using a keyed delay to minimize the amount of output, and therefore, processing performed on events having the same key. One or more embodiments of the invention may provide one or more beneficial technical effects, such as, for example, higher overall system throughput, and/or lower overall resource usage.

A stream processing platform, which includes applications having analytical operators, as described herein, is provided to enable better analysis with more data types for more informed, faster, differentiated decision making. One example of such a stream processing system is one that uses the INFOSPHERE STREAMS middleware application provided by International Business Machines Corporation. The stream processing platform according to one embodiment of the present invention may provide, for example:

An execution engine enabling aggressive production and management of knowledge and information from potentially enormous volumes of data
  digital audio, video and image data, instant messages, network packet traces, text and transactional data, and sensor data;
  new formats and protocols as they are developed.
A programming model in which individual stream processing analytics can:
  perform feature extraction, classification, aggregation and correlation, transformation, and data labeling;
  be composed in a distributed, adaptive, and self-organizing processing graph;
  in order to satisfy thousands of inquiries for relevant information from the available raw data sources.
Tools supporting analytic development, application composition, system monitoring, control, and debug.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Figure 6:
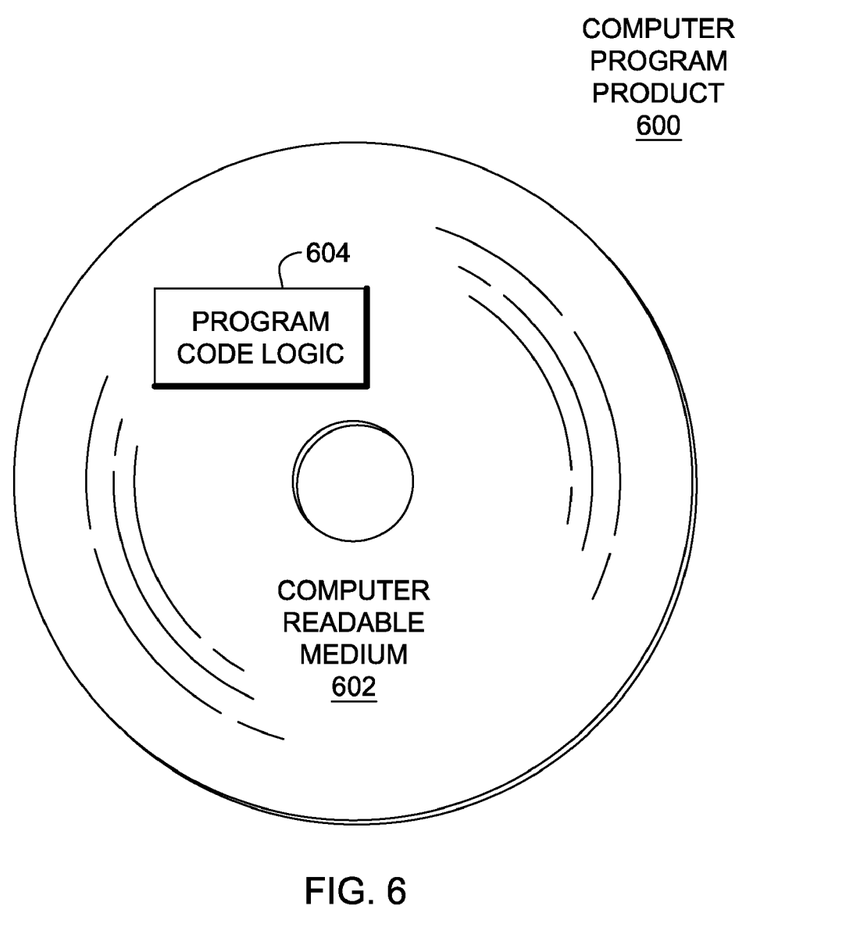
FIG. 6 depicts one embodiment of a computer program product incorporating one or more aspects of the present invention.

Referring now to FIG. 6, in one example, a computer program product 600 includes, for instance, one or more computer readable media 602 to store computer readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, a device coupled to a data processing system can perform one or more aspects of the present invention. Yet further, syntax other than that described herein can represent the operator to be executed. Still further, other operators may be implemented using one or more aspects of the present invention. Additionally, more, less or different data structures may be used; and/or the information in those structures may be different than described herein. Moreover, other formats of data structures or other structures may be used to store the desired information. The phrase "replacing the event" or "outputting the event" includes replacing or outputting, respectively, one or more (not necessarily all) characteristics, features, attributes and/or other representations of the event.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

A data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for processing streaming data, the computer program product comprising:
a computer readable storage medium for execution by a processing circuit for performing a method comprising:
receiving a new event as part of a stream of events, the new event comprising one or more attributes, wherein an attribute of the one or more attributes of the new event comprises a key uniquely identifying an entity to which the new event corresponds;
determining whether the key of the new event of the stream of events matches a key of a previous event received as part of the stream of events, said previous event being currently stored in a stored event data structure as an event to be output;
in response to determining that the key of the new event matches the key of the previous event, replacing the previous event stored as the event to be output with the new event as the event to be output, wherein the replacing comprises:
locating, in the stored event data structure, the previous event stored as the event to be output, the stored event data structure maintaining, for each unique entity of one or more unique entities, a latest received event associated with the unique entity, wherein the previous event stored as the event to be output is the latest event associated with the unique entity identified by the key of the new event; and
updating at least one attribute of the one or more attributes of the stored event to be output to match at least one attribute of the one or more attributes of the new event; and
in response to meeting a specified output condition provided for outputting the event to be output, outputting the event to be output, wherein based on replacing the previous event with the new event as the event to be output, the output event is the new event, wherein the previous event is not output.

2. The computer program product of claim 1, wherein the locating comprises using the key uniquely identifying the entity as an index into the stored event data structure to locate the event stored therein to be output, the key being maintained as an index in an index data structure coupled to the stored event data structure.

3. The computer program product of claim 1, wherein the specified output condition comprises a specified time delay for the key uniquely identifying the entity, the specified time delay indicating an amount of time to pass between output of events corresponding to the entity.

4. The computer program product of claim 1, wherein the specified output condition comprises a specified count delay for the key uniquely identifying the entity, the specified count delay indicating a count of events to be received between output of events corresponding to the entity.

5. The computer program product of claim 1, wherein the outputting comprises:
- determining whether the specified output condition has been met, said determining comprising checking an entry of a timer queue data structure to determine whether the specified output condition has been met, the entry of the timer queue data structure indicating arrival time of the event to be output; and
- in response to determining the specified output condition has been met:
  - removing, from an index data structure maintaining the key uniquely identifying the entity, the key being maintained in the index data structure as an index into the stored event data structure storing the event to be output;
  - providing the stored event to be output to one or more entities;
  - removing the stored event from the stored event data structure; and
  - removing the entry from the timer queue data structure.

6. The computer program product of claim 5, wherein the checking the entry of the timer queue data structure comprises comparing (i) current time minus the indicated arrival time of the stored event to (ii) a specified delay to determine whether the specified output condition has been met.

7. The computer program product of claim 1, wherein the method further comprises:
- receiving the previous event, the previous event comprising the key uniquely identifying the entity;
- in response to receiving the previous event, determining whether the key of the previous event is being maintained in an index data structure for maintaining unique keys as indices into the stored event data structure storing events to be output; and
- in response to determining the key of the previous event is not being maintained in the index data structure:
  - storing the previous event in the stored event data structure as the event to be output;
  - adding an entry for the entity to a timer queue data structure, the entry indicating arrival time of the previous event, the entry used to determine when to output the event to be output; and
  - adding the key of the previous event to the index data structure.

8. The computer program product of claim 1, wherein the receiving, determining and replacing are performed by one thread of processing and the outputting is performed by another thread of processing, and one or more locks are used to provide synchronization.

9. The computer program product of claim 1, wherein the receiving determining, replacing and outputting are performed by one thread of processing.

10. A computer system for processing streaming data, said computer system comprising:
- a memory; and
- a processor in communications with the memory, wherein the computer system is capable of performing a method, said method comprising:
  - receiving a new event as part of a stream of events, the new event comprising one or more attributes, wherein an attribute of the one or more attributes of the new event comprises a key uniquely identifying an entity to which the new event corresponds;
  - determining whether the key of the new event of the stream of events matches a key of a previous event received as part of the stream of events, said previous event being currently stored in a stored event data structure as an event to be output;
  - in response to determining that the key of the new event matches the key of the previous event, replacing the previous event stored as the event to be output with the new event as the event to be output, wherein the replacing comprises:
    - locating, in the stored event data structure, the previous event stored as the event to be output, the stored event data structure maintaining, for each unique entity of one or more unique entities, a latest received event associated with the unique entity, wherein the previous event stored as the event to be output is the latest event associated with the unique entity identified by the key of the new event; and
    - updating at least one attribute of the one or more attributes of the stored event to be output to match at least one attribute of the one or more attributes of the new event; and
  - in response to meeting a specified output condition provided for outputting the event to be output, outputting the event to be output, wherein based on replacing the previous event with the new event as the event to be output, the output event is the new event, wherein the previous event is not output.

11. The computer system of claim 1, wherein the locating comprises using the key uniquely identifying the entity as an index into the stored event data structure to locate the event stored therein to be output, the key being maintained as an index in an index data structure coupled to the stored event data structure.

12. The computer system of claim 10, wherein the outputting comprises:
- determining whether the specified output condition has been met, said determining comprising checking an entry of a timer queue data structure to determine whether the specified output condition has been met, the entry of the timer queue data structure indicating arrival time of the event to be output; and
- in response to determining the specified output condition has been met:
  - removing, from an index data structure maintaining the key uniquely identifying the entity, the key being maintained in the index data structure as an index into the stored event data structure storing the event to be output;
  - providing the stored event to be output to one or more entities;
  - removing the stored event from the stored event data structure; and
  - removing the entry from the timer queue data structure.

13. The computer system of claim 10, wherein the method further comprises:
- receiving the previous event, the previous event comprising the key uniquely identifying the entity;
- in response to receiving the previous event, determining whether the key of the previous event is being maintained in an index data structure for maintaining unique keys as indices into the stored event data structure storing events to be output; and
- in response to determining the key of the previous event is not being maintained in the index data structure:

storing the previous event in the stored event data structure as the event to be output;

adding an entry for the entity to a timer queue data structure, the entry indicating arrival time of the previous event, the entry used to determine when to output the event to be output; and adding the key of the previous event to the index data structure.

14. A method of processing streaming data in a data processing system, said method comprising:

receiving, by a processor of the data processing system, a new event as part of a stream of events, the new event comprising one or more attributes, wherein an attribute of the one or more attributes of the new event comprises a key uniquely identifying an entity to which the new event corresponds;

determining whether the key of the new event of the stream of events matches a key of a previous event received as part of the stream of events, said previous event being currently stored in a stored event data structure as an event to be output;

in response to determining that the key of the new event matches the key of the previous event, replacing, by the processor, the previous event stored as the event to be output with the new event as the event to be output, wherein the replacing comprises:

locating, in the stored event data structure, the previous event stored as the event to be output, the stored event data structure maintaining, for each unique entity of one or more unique entities, a latest received event associated with the unique entity, wherein the previous event stored as the event to be output is the latest event associated with the unique entity identified by the key of the new event; and updating at least one attribute of the one or more attributes of the stored event to be output to match at least one attribute of the one or more attributes of the new event; and in response to meeting a specified output condition provided for outputting the event to be output, outputting the event to be output, wherein based on replacing the previous event with the new event as the event to be output, the output event is the new event, wherein the previous event is not output.

15. The method of claim 14, wherein the locating comprises using the key uniquely identifying the entity as an index into the stored event data structure to locate the event stored therein to be output, the key being maintained as an index in an index data structure coupled to the stored event data structure.

16. The method of claim 14, wherein the outputting comprises:

determining whether the specified output condition has been met, said determining comprising checking an entry of a timer queue data structure to determine whether the specified output condition has been met, the entry of the timer queue data structure indicating arrival time of the event to be output; and in response to determining the specified output condition has been met:

removing, from an index data structure maintaining the key uniquely identifying the entity, the key being maintained in the index data structure as an index into the stored event data structure storing the event to be output;

providing the stored event to be output to one or more entities;

removing the stored event from the stored event data structure; and removing the entry from the timer queue data structure.

17. The method of claim 14, wherein the method further comprises:

receiving the previous event, the previous event comprising the key uniquely identifying the entity;

in response to receiving the previous event, determining whether the key of the previous event is being maintained in an index data structure for maintaining unique keys as indices into the stored event data structure storing events to be output; and in response to determining the key of the previous event is not being maintained in the index data structure:

storing the previous event in the stored event data structure as the event to be output;

adding an entry for the entity to a timer queue data structure, the entry indicating arrival time of the previous event, the entry used to determine when to output the event to be output; and adding the key of the previous event to the index data structure.

* * * * *